United States Patent
Vaishnavi et al.

(10) Patent No.: US 10,979,921 B2
(45) Date of Patent: Apr. 13, 2021

(54) SYSTEMS AND METHODS FOR MONITORING NETWORK SLICES USING PROBES

(71) Applicant: Huawei Technologies Co., Ltd., Shenzhen (CN)

(72) Inventors: Ishan Vaishnavi, Munich (DE); Xueli An, Munich (DE); Wint Yi Poe, Munich (DE); Chenghui Peng, Munich (DE); Riccardo Trivisonno, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/509,882

(22) Filed: Jul. 12, 2019

(65) Prior Publication Data
US 2019/0335349 A1    Oct. 31, 2019

Related U.S. Application Data

(63) Continuation of application No. PCT/EP2017/050713, filed on Jan. 13, 2017.

(51) Int. Cl.
*H04W 24/08* (2009.01)
*H04L 12/24* (2006.01)
*H04L 12/26* (2006.01)

(52) U.S. Cl.
CPC .......... *H04W 24/08* (2013.01); *H04L 41/069* (2013.01); *H04L 41/5009* (2013.01); *H04L 43/12* (2013.01)

(58) Field of Classification Search
CPC ..... H04W 24/08; H04W 48/18; H04W 24/06; H04L 41/069; H04L 41/5009; H04L 43/12
See application file for complete search history.

(56) References Cited

U.S. PATENT DOCUMENTS 9,853,877 B2 * 12/2017 Manghirmalani ...... H04L 43/12
9,954,720 B2 * 4/2018 Fallon ................. H04L 41/0266
(Continued)

FOREIGN PATENT DOCUMENTS

| CN | 104468688 A | 3/2015 |
| CN | 106063194 A | 10/2016 |

(Continued)

OTHER PUBLICATIONS

Jan Groenendijk et al.,"Minutes for Minutes for Study on Management and Orchestration of Network Slicing," 3GPP TSG-SA5 (Telecom Management) SA5#109, San Francisco, CA, XP051171475, S5-165030, pp. 1-10, 3rd Generation Partnership Project, Valbonne, France (Aug. 29-Sep. 2, 2016).
(Continued)

*Primary Examiner* — Ian N Moore
*Assistant Examiner* — Rushil Parimal Sampat
(74) *Attorney, Agent, or Firm* — Leydig, Voit & Mayer, Ltd.

(57) ABSTRACT

The present disclosure relates to a slice monitor for monitoring slices programmed by a slice owner and deployed by an orchestrator in the control and data planes of a communication network. The slice monitor comprises multiple databases containing different types of information, selects the probes to monitor each slice in the control plane or the data plane and instantiates the selected probes as well as a single-slice monitoring device specific to each slice. For optimization, the slice monitor configures the content of its databases by communicating through multiple interfaces with different actors such as the slice owner, the owner of the orchestrator and the owner of itself. Using alarm handlers and a reconfiguration engine, the slice monitor together with the single-slice monitoring device can detect and compensate for possible violations in the service-level agreement by (Continued)

reconfiguring the slice. If the compensation fails, the slice monitor requests the orchestrator for reconfiguration.

16 Claims, 4 Drawing Sheets

(56) References Cited

U.S. PATENT DOCUMENTS

| | | |
|---|---|---|
| 2015/0082308 A1 | 3/2015 | Kiess et al. |
| 2016/0294664 A1 | 10/2016 | Manghirmalani et al. |
| 2016/0353367 A1 | 12/2016 | Vrzic et al. |

FOREIGN PATENT DOCUMENTS

| | | |
|---|---|---|
| EP | 3103217 B1 | 10/2019 |
| WO | 2008121062 A1 | 10/2008 |

OTHER PUBLICATIONS

"Use case and Requirement Monitor Performance of a network slice instance," 3GPP TSG SA WG5 (Telecom Management) Meeting #110, Reno, NV, XP051186349, S5-166208, pp. 1-4, 3rd Generation Partnership Project, Valbonne, France (Nov. 14-18, 2016).

"Proposed requirement on Slice Monitoring for 3rd party," 3GPP TSG-SA WG1 Meeting #76-bis,Spokane, WA, XP051205357, S1-170093, pp. 1-2, 3rd Generation Partnership Project, Valbonne, France (Jan. 16-20, 2017).

"Add use case and requirements for network slice performance threshold," 3GPP TSG SA WG5 (Telecom Management) Meeting #111, Porto, Portugal, XP051205932, S5-17113716-20, pp. 1-2, #rd Generation Partnership Project, Valbonne, France (Jan. 2017).

Trivisonno et al., "SDN-based 5G mobile networks: architecture, functions, procedures and backward compatibility," Transactions on Emerging Telecommunications Technologies, vol. 26, No. 1, pp. 82-92, John Wiley & Sons, Inc., New York, New York (Dec. 5, 2015).

\* cited by examiner

SYSTEMS AND METHODS FOR MONITORING NETWORK SLICES USING PROBES

CROSS-REFERENCE TO RELATED APPLICATIONS

This application is a continuation of International Application No. PCT/EP2017/050713, filed on Jan. 13, 2017, the disclosure of which is hereby incorporated by reference in its entirety.

TECHNICAL FIELD

The present disclosure relates to a modularized and sliced network architecture, and more particularly to the monitoring of network slices deployed in the control and data planes of a communication network.

BACKGROUND

According to the industry consensus, the 5th generation (5G) mobile technology will be standardized and deployed by 2020. Compared to the 4th generation (4G) mobile technology, the devices and applications of the next generation network will support use cases with a very high diversity in terms of performance attributes, such as ultra-reliable communications for mission critical services, eHealth, public safety, real-time vehicle control, tactile Internet and connectivity for drones. In order to support services with such a diverse range of requirements, the architecture fitting all the solutions used in the 4G network will be not scalable for the myriad of different use cases. Thus, the network slicing concept is expected to be one of the key building blocks of the future 5G network according to the recent standardization agreements. Indeed, the current understanding of the 5G architecture is that each type of device or application will have its own architectural slice, which will be configured just for their requirements. The device or application will be provided by a slice owner and hosted by an operator, and the slice owner will be a vertical or an over-the-top provider of the device or application, so that the network slicing concept will enable a service-tailored network function provisioning scheme aiming in particular at vertical industries integration.

However, once the slice is deployed, the question arises about how the functioning of the slice is assured to the slice owner. The essence of the problem is that hosting virtual slices creates multiple levels of abstraction and introduces a lot of new actors to the system. At each level and for each actor information on the aspect of performance of the slice, the actor is interested in needs to be provided. Conventional monitoring systems are inbuilt into the management plane of the device they monitor and do not provide extensible monitoring capabilities. Newer monitoring systems provide this extensibility as regards the dynamic probe creation, but lack the capability to smartly calculate the creation and placement of probes in an efficient fashion.

SUMMARY

It is therefore an object of the present disclosure to provide a slice monitor apparatus, a system and a method for monitoring network slices deployed in the control and data planes of a communication network.

The object is achieved by the features of the independent claims. Further embodiments of the disclosure are apparent from the dependent claims, the description and the figures.

According to a first aspect, the disclosure relates to a slice monitor (A-CNS) for monitoring at least one network slice in a communication network. The slice monitor (A-CNS) comprises at least one database adapted to store multiple probes, store a collection of probe selection profiles, provide a set of network function (NF) or slice key performance indicators (KPIs) mapped to at least one probe amongst the multiple probes, and provide an information about the collection of probe selection profiles, and comprises at least one engine adapted, as a first operation, to select at least one amongst the at least one probe being mapped to the NF or slice KPIs based on the information about the collection of probe selection profiles, and adapted, as a second operation, to instantiate the at least one selected probe based on an information from the entirety of the at least one database, wherein the communication network has a control plane (CP) and a data plane (DP), which may be separated from each other, each network slice is a collection of interconnected network functions (NFs) in the CP and the DP, which defines the respective CP and DP slices, and each CP and DP slice is monitored by the at least one selected probe.

Thereby, the slice monitor (A-CNS) can monitor, through a selection and instantiation of appropriate probes and based on key performance indicators (KPIs), the inter-connected network functions (NFs) in the CP and DP slices that have been deployed, for example, by an orchestrator. Moreover, multiple profiles can be selected from the collection of probe selection profiles by different actors, such as the slice owner, the owner of the orchestrator and the owner of the slice monitor (A-CNS).

According to a first implementation of the slice monitor (A-CNS) according to the first aspect, the at least one database is adapted to store multiple alarms for each NF KPI or each slice KPI associated to a service-level agreement (SLA), each alarm corresponding to a violation of the SLA.

Thereby, specific alarms can be set up and the slice monitor (A-CNS) can detect for possible violations in the service-level agreement (SLA) or other undesired behaviors.

According to a second implementation of the slice monitor (A-CNS) according to the first implementation of the first aspect, the at least one database is adapted to store a plurality of interrupt handlers, each interrupt handler being susceptible to be associated to at least one alarm amongst the multiple alarms stored in the at least one database.

Thereby, specific interrupt handlers to process the alarms can be configured and the slice monitor (A-CNS) can compensate for the possible violations in the service-level agreement (SLA) or other undesired behaviors as detected by the alarms.

According to a third implementation of the slice monitor (A-CNS) according to the first aspect or any one of the preceding implementations of the first aspect, the at least one database is configurable by the owner of the slice monitor (A-CNS) through a configuration of the content of the entirety of the at least one database.

Thereby, the owner of the slice monitor (A-CNS) can monitor its own requirements. The owners of the slice monitor (A-CNS) and the orchestrator might be a same owner.

According to a fourth implementation of the slice monitor (A-CNS) according to the third implementation of the first aspect, configuring the content of the entirety of the at least one database comprises modifying and/or deleting existing elements inside thereof and/or adding other elements inside thereof.

Thereby, the content of the entirety of the at least one database can be dynamically adjusted and configured.

According to a fifth implementation of the slice monitor (A-CNS) according to the third or fourth implementation of the first aspect, the owner of the slice monitor (A-CNS) can over a first interface (I-Cf) configure the entirety of the at least one database.

Thereby, the owner of the slice monitor (A-CNS) can configure the specificities of the slice monitor (A-CNS) such as the algorithm to be used for the selection of the most optimal probes, the protocols to be used for the connection of the probes and the locations of a database in which ticket collection points can be established. Thus, the CP and DP slices will be programmed.

According to a sixth implementation of the slice monitor (A-CNS) according to the first implementation of the first aspect, the owner of each network slice to be installed in the communication network can over a second interface (I-AM) transmit a CP and DP slice-based information along with the SLA related to a performance of the corresponding interconnected NFs in the CP and the DP.

Thereby, the slice monitor (A-CNS) can receive from the slice owner any detailed specification of the CP and DP slices to be installed.

According to a seventh implementation of the slice monitor (A-CNS) according to the first implementation of the first aspect, the slice monitor (A-CNS) can over a third interface (I-AS) transmit a slice-oriented request towards a single-slice monitoring device (A-CNS-S) adapted to monitor an individual slice amongst the at least one network slice and the slice monitor (A-CNS) can over the third interface (I-AS) receive, from the single-slice monitoring device (A-CNS-S) and in response to the violation of the SLA detected by an alarm detector of the single-slice monitoring device (A-CNS-S), a request for a reconfiguration of the individual slice through a reconfiguration engine inside the slice monitor (A-CNS).

Thereby, the slice monitor (A-CNS) together with the single-slice monitoring device (A-CNS-S) can optimally monitor the CP and DP slices in order to match the performance expected by the slice owner.

According to an eighth implementation of the slice monitor (A-CNS) according to the seventh implementation of the first aspect, an orchestrator can over a fourth interface (I-Or) transmit a decision on the positioning of the NFs in the CP and the DP and the slice monitor (A-CNS) can over the fourth interface (I-Or) request to the orchestrator a reconfiguration of the individual slice from the single-slice monitoring device (A-CNS-S) when the slice monitor (A-CNS) itself fails to carry out the reconfiguration through the reconfiguration engine.

Thereby, the slice monitor (A-CNS) can request any slice reconfiguration and report any failures to the orchestrator. For example, the slice monitor (A-CNS) can query the owner of the orchestrator in order to request its preferences, which can be different from the slice owner's preferences, or the owner of the orchestrator can itself provide its preferences to the slice monitor (A-CNS).

According to a ninth implementation of the slice monitor (A-CNS) according to the seventh or eighth implementation of the first aspect, the at least one engine is adapted, as a third operation, to instantiate the single-slice monitoring device (A-CNS-S) together with a collection of a respective slice-based monitoring information reported by each instantiated selected probe towards a dedicated collection database of the single-slice monitoring device (A-CNS-S).

Thereby, the slice-based monitoring information of the dedicated collection database, such as a ticket collection point database, can be collected and processed by the single-slice monitoring device (A-CNS-S). Furthermore, each instantiated selected probe can be configured by the at least one engine to report its respective slice-based monitoring information towards the dedicated collection database.

According to a tenth implementation of the slice monitor (A-CNS) according to the ninth implementation of the first aspect, the single-slice monitoring device (A-CNS-S) reports the collection of each respective slice-based monitoring information towards the slice owner.

Thereby, the slice owner can remain abreast of the collected information that is specific to its slice. In particular, the single-slice monitoring device (A-CNS-S) will periodically process this information stored in the dedicated collection database and will then report it to any interested actors such as the slice owner.

According to an eleventh implementation of the slice monitor (A-CNS) according to the ninth implementation of the first aspect, the at least one engine comprises at least one calculation engine and a single instantiation engine, the at least one calculation engine being adapted to perform the first operation and the single instantiation engine being adapted to perform the second and third operations.

Thereby, a single instantiation engine can ask multiple calculation engines, which can be offered as a service by different calculation providers, about the possible solutions and can then pick the solution with the best output.

According to a twelfth implementation of the slice monitor (A-CNS) according to the eighth implementation of the first aspect, the slice monitor (A-CNS) can be implemented as a part of the orchestrator.

Thereby, the corresponding fourth interface (I-Or) can be an internal interface between the slice monitor (A-CNS) and the orchestrator.

The above object is also solved in accordance with a second aspect.

According to the second aspect, the disclosure relates to a system for monitoring at least one network slice in a communication network. The system comprises the orchestrator as specified in the eighth implementation of the first aspect, which is adapted to deploy the at least one network slice throughout the communication network, at least one single-slice monitoring device (A-CNS-S) as specified in the seventh implementation of the first aspect, and the slice monitor (A-CNS) as specified in the first aspect and any one of the preceding implementations of the first aspect, which is adapted to monitor the at least one network slice deployed by the orchestrator and adapted to monitor each single-slice monitoring device (A-CNS-S).

According to a first implementation of the second aspect, each single-slice monitoring device (A-CNS-S) is adapted to monitor the corresponding access network (AN) over a fifth interface (I-An).

The above object is also solved in accordance with a third aspect.

According to the third aspect, the disclosure relates to a method for monitoring at least one network slice in a communication network. The method comprises the steps of storing multiple probes, storing a collection of probe selection profiles, providing a set of network function (NF) or slice key performance indicators (KPIs) mapped to at least one probe amongst the multiple probes, providing an information about the collection of probe selection profiles, selecting at least one amongst the at least one probe being mapped to the NF or slice KPIs based on the information about the collection of probe selection profiles, and instantiating the at least one selected probe based on an information from the entirety of the at least one database, wherein the communication network has a control plane (CP) and a data plane (DP), which may be separated from each other, each network slice is a collection of inter-connected network functions (NFs) in the CP and the DP, which defines the respective CP and DP slices, and each CP and DP slice is monitored by the at least one selected probe.

The above object is also solved in accordance with a fourth aspect.

According to the fourth aspect, the disclosure relates to a computer program comprising a program code for performing the method according to the third aspect when executed on a computer.

Thereby, the method can be performed in an automatic and repeatable manner.

The computer program can be performed by the above apparatuses. The apparatuses can be programmably arranged to perform the computer program.

More specifically, it should be noted that the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the internet.

It shall further be understood that a preferred embodiment of the disclosure can also be any combination of the dependent claims or above embodiments with the respective independent claim.

These and other aspects of the disclosure will be apparent and elucidated with reference to the embodiments described hereinafter.

BRIEF DESCRIPTION OF DRAWINGS

In the following detailed portion of the present disclosure, the disclosure will be explained in more detail with reference to the exemplary embodiments shown in the drawings, in which.

Identical reference signs are used for identical or at least functionally equivalent features.

DESCRIPTION OF EMBODIMENTS

Figure 1:
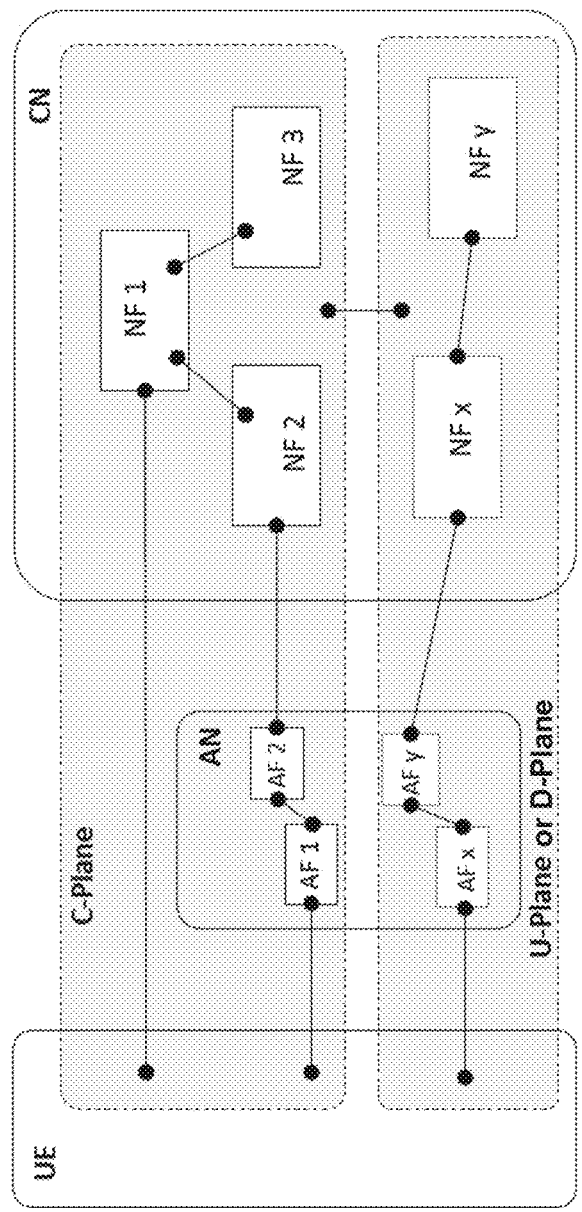
FIG. 1 shows a network architecture 100 used as reference model according to an embodiment of the present disclosure.

FIG. 1 shows a network architecture 100 used as a reference model according to an embodiment of the present disclosure.

The network architecture 100 can either be realized using any implementation paradigms such as network function virtualization (NFV) and/or software-defined networking (SDN) paradigms, or rely on dedicated hardware appliances.

As can be gathered from FIG. 1, the network architecture 100 deploys over the physical infrastructure a slice that is composed of a collection of user plane (U-Plane) (also denoted by data plane (DP)) functions and control plane (C-Plane or CP) functions, such as application functions (AFs) in the access network (AN) and (virtualized) network functions (NFs) in the control network (CN), inter-connected between each of them. As can be seen, the reference model of FIG. 1 prescribes a separation between the CP and the DP. Moreover, in the present disclosure, the (virtualized) NF refers to a core network (CN) CP network function and can, for example, correspond to a connection management (CM), a mobility management (MM), a forwarding management (FM), an authentication and authorization (AA) or a security management (SM), as found in: R. Trivisonno, R. Guerzoni, I. Vaishnavi and D. Soldani, "SDN-based 5G mobile networks: architecture, functions, procedures and backward compatibility", Transactions on Emerging Telecommunications Technologies, vol. 26, no. 1, pp. 82-92, 2015. More specifically, the CM terminates the non-access stratum (NAS) at the CN side and controls the key device procedures such as the access connection management, the forwarding path management, the identifiers resolution, the address allocation, the service request and the slice attachment. The MM controls the device reachability, the tracking area management, the paging and the handover procedures. The FM performs the packet routing configuration for the DP. The AA performs the authentication and authorization of the devices and the SM performs the access stratum (AS) and non-access stratum (NAS) security management.

The CP and the DP within the mobile telecommunication network can be built upon virtual and/or physical infrastructures including wireless access points (APs), data centers, edge data centers or points of presence, which are interconnected through a transport network realized by either legacy connectivity methods or virtual links or virtual switches or virtual routers controlled by SDN controllers. The CP can be composed by a library of control applications as found in: R. Trivisonno, R. Guerzoni, I. Vaishnavi and D. Soldani, "SDN-based 5G mobile networks: architecture, functions, procedures and backward compatibility", Transactions on Emerging Telecommunications Technologies, vol. 26, no. 1, pp. 82-92, 2015. In addition, in each respective slice, the slice owner shall be able to define his own set of control applications intended to perform a specified role possibly related to his own slice. The slice owner can be defined as the organization requesting the slice and can, for example, be the operator or the service provider. The same model may also be applied to the DP.

Figure 2:
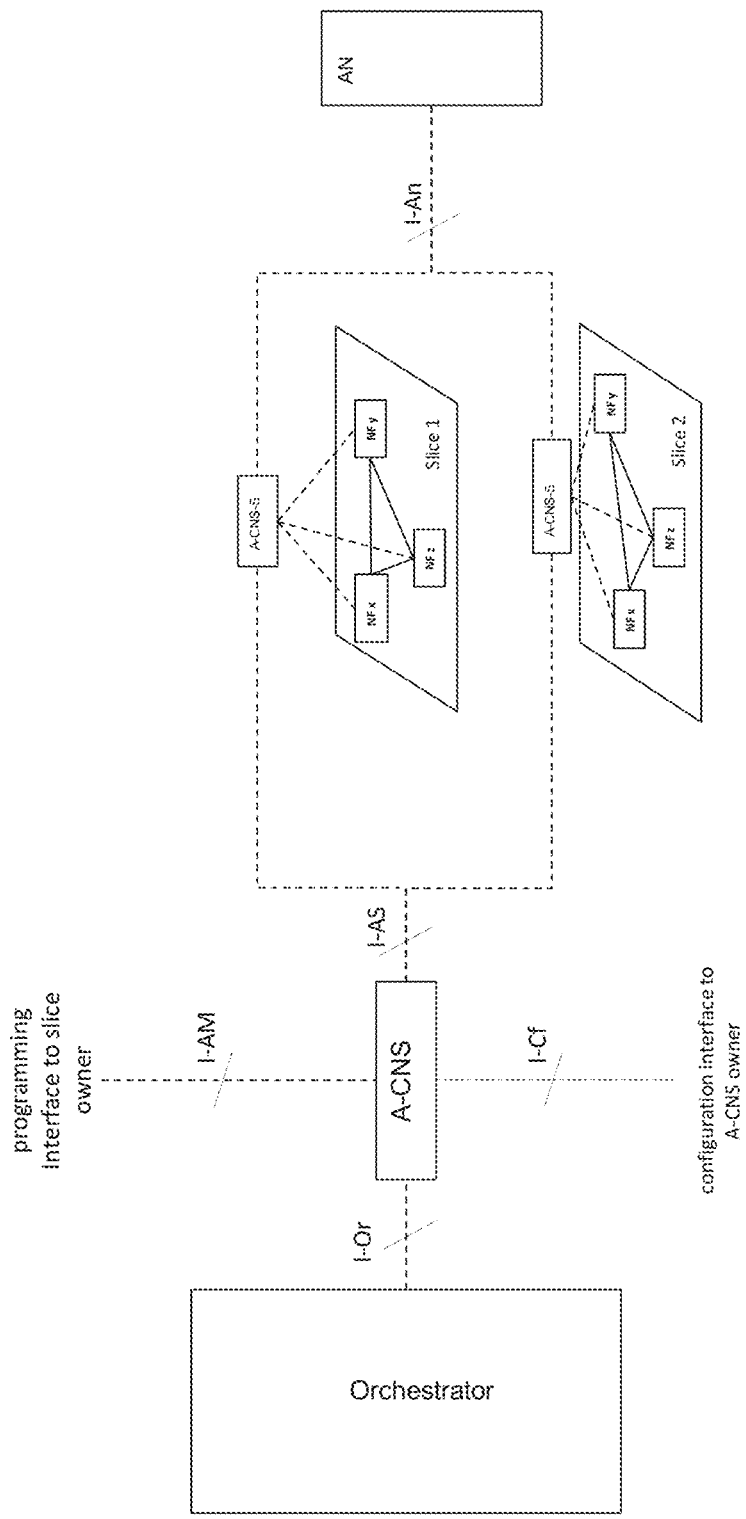
FIG. 2 shows a system architecture 200 in which a slice monitor (A-CNS) is centrally placed according to an embodiment of the present disclosure.

FIG. 2 shows a system architecture 200 in which a slice monitor (A-CNS) is centrally placed according to an embodiment of the present disclosure.

In addition to the slice monitor (A-CNS), which is also called "slice assurance component", the system architecture 200 comprises an orchestrator, at least one single-slice monitoring device (A-CNS-S) and multiple interfaces (I-Cf, I-AM, I-AS, I-Or) allowing a communication from and towards the slice monitor (A-CNS).

The orchestrator can be used to provide an orchestration of resource slices consisting of computing and network resources allocated to support the communication and operation of a service slice, to deploy service slices over the physical infrastructure of FIG. 2 according to the deployment template, and to manage the lifecycle of the service slices. In the present disclosure, the operator owns the orchestrator and may or may not also own the physical infrastructure. In addition, a service slice is defined as referring to a slice in the CP or the DP and consists of a set of logical NFs in the CP and the DP along with their logical inter-connections between each of them. All these NFs build together the CP in order to support the communication service for a particular cluster of services having homogenous functional and performance requirements.

Generally speaking, the slice monitor (A-CNS) is adapted to decide how the slice that has been deployed by the orchestrator can be monitored. In more details, the owner of the A-CNS can configure the specification parameters of the A-CNS, such as the algorithm to be used for selecting the most optimal probes, the protocols to be used to connect to the probes and the locations of the database, over the interface I-Cf, which is also called "configuration interface". The orchestrator predominantly provides the A-CNS with a decision on the positioning of the (virtualized) NFs in both the CP and the DP over the interface I-Or. The A-CNS is a part of the management infrastructure and is started up and configured together with the orchestrator. The A-CNS can also request reconfigurations of the CP and DP from the orchestrator over the same interface I-Or. Although the A-CNS is depicted in FIG. 2 as a separate entity with respect to the orchestrator, it should be noted that, in another embodiment of the present disclosure, the A-CNS can be implemented as a part of the orchestrator. In such a case of collocation, the interface I-Or would then become an internal interface. Over the interface I-AM, which is also called "programming interface", the A-CNS receives from the owner of each slice the detailed specification of the slices to be installed in both the CP and the DP. Such a specification can include the way the composing NFs are inter-connected and the service-level agreements (SLAs) about the performance of those NFs and their connections. If the A-CNS ought to be implemented inside the orchestrator, the interface I-AM would then become an internal interface. Over the interface I-AS, the A-CNS issues slice-oriented requests towards the single-slice monitoring device (A-CNS-S), which is specific to each slice and focuses on individual slice monitoring. It should be noted that the A-CNS-S can be instantiated by the A-CNS and co-exist with the A-CNS.

As depicted in FIG. 2, each single-slice monitoring device (A-CNS-S) can also monitor the access network (AN) over an interface I-An with the aim of enabling an end-to-end solution involving both the access network (AN) and the core network (CN). If the AN has its own monitoring entity, then the interface I-An can be used by the A-CNS-S to receive the status of the radio resource and to allow the end-to-end slice-related performance to be reported from the AN towards the slice owner via the interface I-AM.

Figure 3:
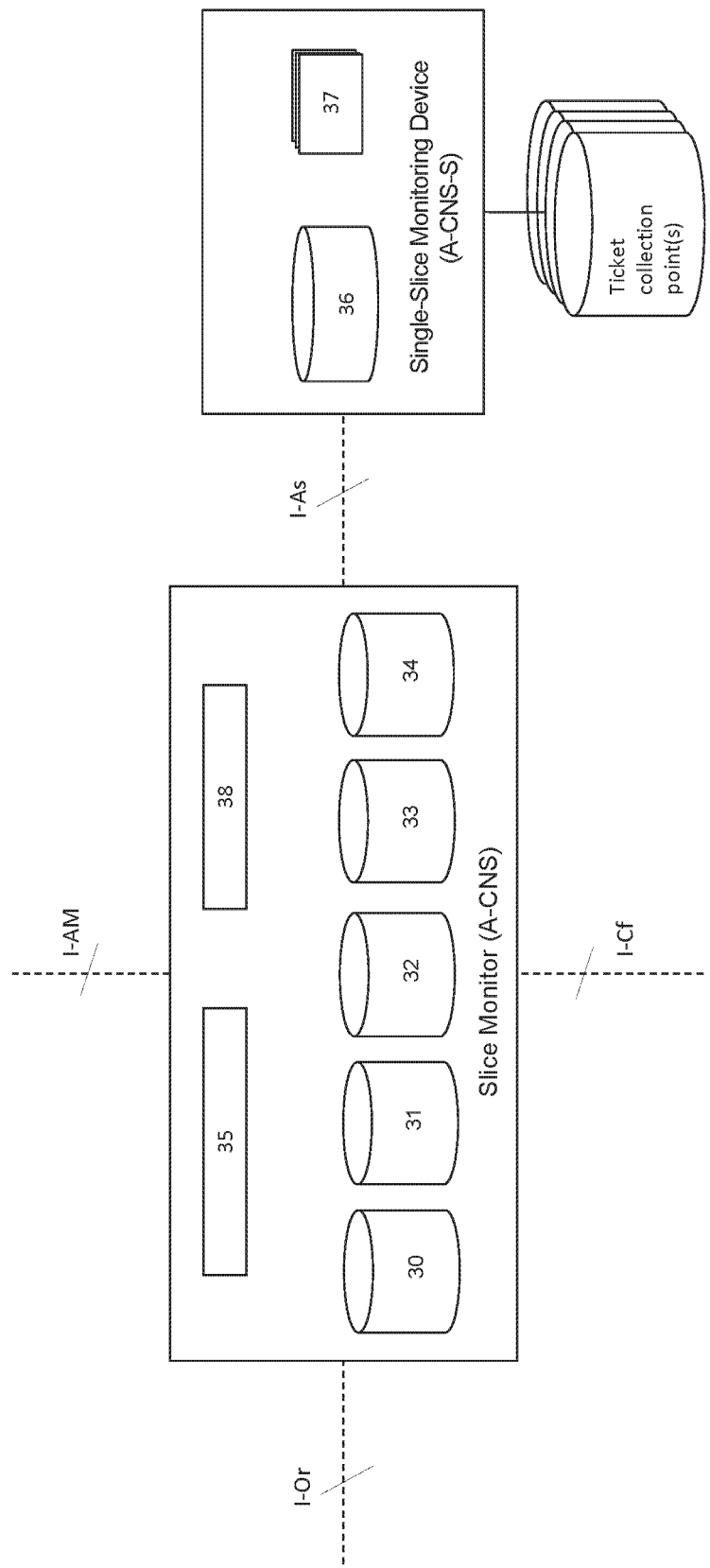
FIG. 3 shows a specific architecture 300 of a slice monitor (A-CNS) and a single-slice monitoring device (A-CNS-S) with their respective sub-components and interfaces according to an embodiment of the present disclosure.

Referring to the system architecture 200 of FIG. 2, FIG. 3 shows a specific architecture 300 of the slice monitor (A-CNS) and the single-slice monitoring device (A-CNS-S) with their respective sub-components and interfaces according to an embodiment of the present disclosure.

In the present disclosure, the A-CNS consists of at least one database containing different types of information. In an exemplary embodiment, the at least one database may be split into multiple individual databases respectively dedicated to a type of information, as illustrated in FIG. 3. The first database 31 maintains the mapping from a set of NF key performance indicators (KPIs) or slice key performance indicators (KPIs) to the probes that are actually able to measure the KPIs. Each KPI can be measured using multiple probes, which are stored in a second database 30 as a probe library. For example, a probe could be used when the isolation is requested and another one with a better resource efficiency could be used when the isolation is not required. Thus, this first database 31 can also specify a cost in terms of resources, such as compute, storage and bandwidth, for instantiating each of those probes. These costs are used in a third database 32 as a collection of probe selection profiles in order to identify different optimization criteria based on which the probes can be selected. For each slice request, there can be multiple profiles selected by different actors such as the slice owner, the owner of the orchestrator and the owner of the A-CNS, according to their respective own interest. For example, the slice owner can select a monitoring profile, the owner of the orchestrator can select another one while the owner of the A-CNS can select one different from the two other ones. For each NF or slice KPI associated to a service-level agreement (SLA), respective violation alarms are stored in a fourth database 33 as an alarm database. To each stored alarm is associated a respective interrupt handler, which is stored in a fifth database 34. The owner of the A-CNS can program all the databases through the interface I-Cf in order to configure their respective content by modifying and/or deleting existing elements inside thereof and/or adding other elements inside thereof.

As depicted in FIG. 3, the A-CNS further consists of at least one engine 35, which may structurally comprise at least one calculation engine and a single instantiation engine or which may merely have the functionality of each of those calculation and instantiation engines while being formed in one piece. The calculation engine uses the information in all these databases together with the information received from the slice owner through the interface I-AM (namely the CP and DP slice-based information and the SLA related to the performance of the corresponding inter-connected NFs in the CP and the DP), together with the information received from the orchestrator through the interface I-Or (namely the decision on the positioning of the NFs in the CP and the DP), and based on the selected profiles by the different actors (namely the slice owner, the owner of the orchestrator and the owner of the A-CNS), in order to calculate (i.e., select) the probes and alarms to be instantiated and to calculate (i.e., determine) the location where they will be instantiated. The calculation typically optimizes various parameters of the network, such as the cost of hosting all the probes while meeting the constraints on all the required information about the monitoring details it is expected to provide. The calculation engine may also be optimized as regards the instantiation of probes by reusing preexisting probes. Thus, the calculation engine needs to store this information about the type of probes to be instantiated and the location somewhere in the system architecture 200. A typical implementation of the calculation algorithm can be using a mixed integer linear programming formulation.

Then, the instantiation engine instantiates, over the physical infrastructure, those probes to be instantiated as well as the A-CNS-S together with its ticket collection points of a ticket collection database in order to collect and process a slice-based monitoring information. The tickets refer to the monitoring information reported by each probe into the ticket collection database. The A-CNS-S, which is dedicated to a respective single slice, comprises a sixth database 36 containing a slice-based information about, for example, the probes that have been installed, their respective locations, the way the ticket collection points shall be processed, the appropriate SLA, the alarms and the alarm handling procedures. The instantiated probes are configured by the instantiation engine of the at least one engine 35 to report the collected slice-based monitoring information at a predefined period towards the ticket collection points of the A-CNS-S. In turn, the A-CNS-S will periodically process the slice-based monitoring information in the ticket collection points and report it to the slice owner as well as to any other actor that may be interested based on the profile selected by that actor. The A-CNS-S also comprises at least one alarm handler 37, which is a daemon listening to any alarms raised by the infrastructure or the elements forming the slice. The alarm handler 37 acts as a de-multiplexer by raising the appropriate alarm. It can evaluate this raised alarm and the history of the alarm-based measurements and can, based on this evaluation, make the decision to request a reconfiguration of the slice to the reconfiguration engine 38 of the A-CNS. In turn, the reconfiguration engine 38 inside the A-CNS can achieve its own evaluation and reconfigure further issues if needed. The reconfiguration engine 38 is also adapted to evaluate whether the alarm is raised by a failure in the infrastructure or by a failure of the probe itself. To verify this, it may use other globally available information from other slices. If it is unable to rectify the alarm, then it must raise the issue with the orchestrator while possibly reporting the condition to the slice owner in addition to recommending penalties to the owner of the orchestrator and/or the owner of the infrastructure.

Figure 4:
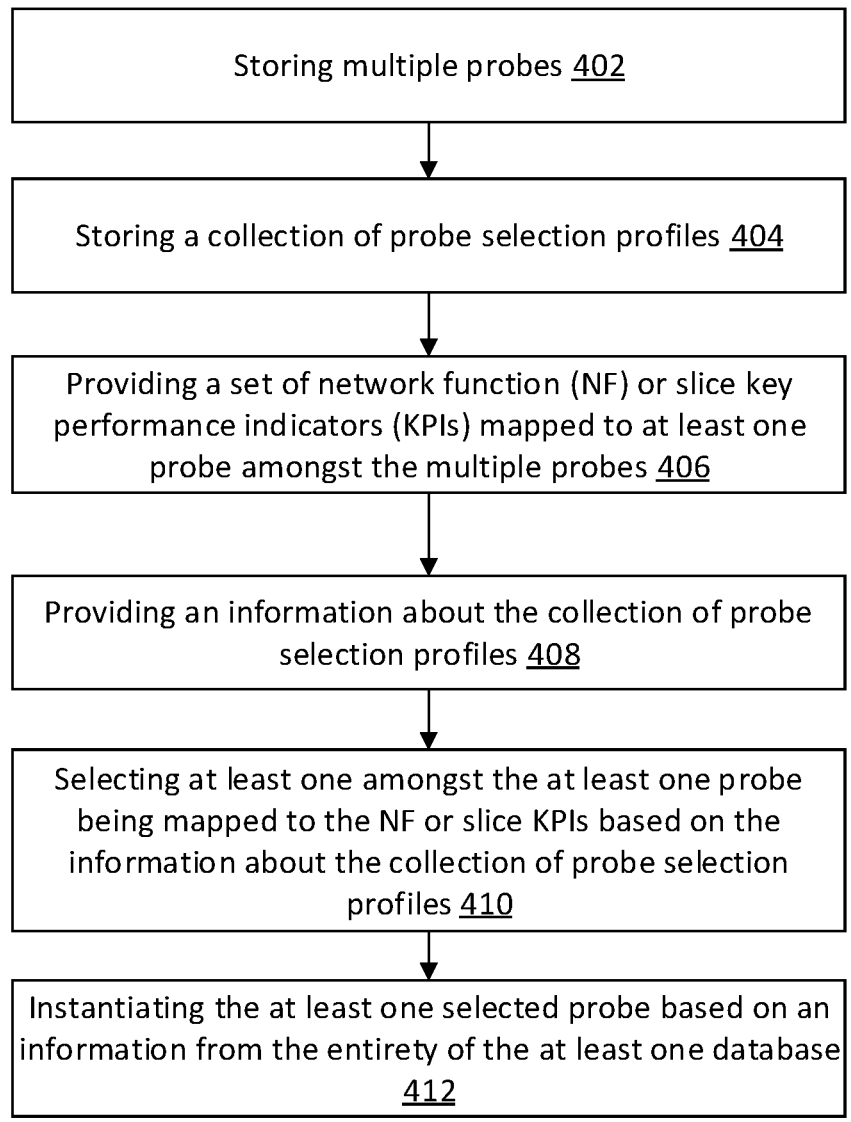
FIG. 4 shows a method for monitoring at least one network slice in a communication network, according to one aspect.

According one aspect, FIG. 4 relates to a method for monitoring at least one network slice in a communication network. The method comprises the steps of storing multiple probes (step 402), storing a collection of probe selection profiles (step 404), providing a set of network function (NF) or slice key performance indicators (KPIs) mapped to at least one probe amongst the multiple probes (step 406), providing an information about the collection of probe selection profiles (step 408), selecting at least one amongst the at least one probe being mapped to the NF or slice KPIs based on the information about the collection of probe selection profiles (step 410), and instantiating the at least one selected probe based on an information from the entirety of the at least one database (step 412), wherein the communication network has a control plane (CP) and a data plane (DP), which may be separated from each other, each network slice is a collection of inter-connected network functions (NFs) in the CP and the DP, which defines the respective CP and DP slices, and each CP and DP slice is monitored by the at least one selected probe.

In summary, the present disclosure relates to a slice monitor (A-CNS) for monitoring slices programmed by a slice owner and deployed by an orchestrator in the control and data planes (CP, DP) of a communication network. The slice monitor (A-CNS) comprises multiple databases (30-34) containing different types of information, selects the probes to monitor each slice in the control plane (CP) or the data plane (DP) and instantiates the selected probes as well as a single-slice monitoring device (A-CNS-S) specific to each slice. For optimization, the slice monitor (A-CNS) configures the content of its databases (30-34) by communicating through multiple interfaces (I-AM, I-Or, I-Cf) with different actors such as the slice owner, the owner of the orchestrator and the owner of itself. Using alarm handlers (37) and a reconfiguration engine (38), the slice monitor together with the single-slice monitoring device (A-CNS-S) can detect and compensate for possible violations in the service-level agreement (SLA) by reconfiguring the slice. If the compensation fails, the slice monitor (A-CNS) requests the orchestrator for reconfiguration.

While the disclosure has been illustrated and described in detail in the drawings and the foregoing description, such illustration and description are to be considered illustrative or exemplary and not restrictive. The disclosure is not limited to the disclosed embodiments. From reading the present disclosure, other modifications will be apparent to a person skilled in the art. Such modifications may involve other features, which are already known in the art and may be used instead of or in addition to features already described herein.

The disclosure has been described in conjunction with various embodiments herein. However, other variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present disclosure has been described with reference to specific features and embodiments thereof, it is evident that various modifications and combinations can be made thereto without departing from the spirit and scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A slice monitor (A-CNS) for monitoring at least one network slice in a communication network, the A-CNS comprising:
    at least one database adapted to store multiple probes, store a collection of probe selection profiles, provide a set of network functions (NFs) or slice key performance indicators (KPIs) mapped to at least one probe among the multiple probes, and provide information about the collection of probe selection profiles; and
    at least one processor adapted to, as a first operation, select the at least one probe mapped to the set of NFs or the slice KPIs based on the information about the collection of probe selection profiles, and adapted to, as a second operation, instantiate the at least one probe based on information from the at least one database,
    wherein the communication network has a control plane (CP) and a data plane (DP), wherein the CP and DP are separated from each other;
    wherein each network slice is a collection of inter-connected NFs in the CP and the DP, which defines respective CP and DP slices; and
    wherein each CP slice and each DP slice is monitored by the at least one probe selected via the first operation and instantiated via the second operation;
    wherein the at least one database is further adapted to store multiple alarms for each NF or each slice KPI associated to a service-level agreement (SLA), each alarm corresponding to a violation of the SLA;

wherein the A-CNS is configured to transmit, over a third interface (I-AS), a slice-oriented request towards a single-slice monitoring device (A-CNS-S) adapted to monitor an individual slice among the at least one network slice; and wherein the A-CNS is configured to receive, over the I-AS from the A-CNS-S and in response to the violation of the SLA detected by an alarm detector of the A-CNS-S, a request for a reconfiguration of the individual slice through a reconfiguration engine inside the A-CNS.

2. The A-CNS of claim 1, wherein the at least one database is adapted to store a plurality of interrupt handlers, each interrupt handler associated to at least one alarm among the multiple alarms stored in the at least one database.

3. The A-CNS of claim 1, wherein the at least one database is configurable through a configuration of content of the at least one database.

4. The A-CNS of claim 3, wherein configuring the content of the at least one database comprises at least one of modifying or deleting existing elements inside the at least one database or adding other elements inside the at least one database.

5. The A-CNS of claim 3, wherein the at least one database is configurable over a first interface (I-Cf).

6. The A-CNS of claim 1, wherein CP slice-based information and DP slice-based information is transmitted over a second interface (I-AM) along with the SLA related to a performance of the corresponding inter-connected NFs in the CP and the DP.

7. The A-CNS of claim 1,
wherein the A-CNS is configured to transmit a decision on positioning of the NFs in the CP and the DP over a fourth interface (I-Or); and
wherein the A-CNS is configured to request, over the I-Or, a reconfiguration of the individual slice from the A-CNS-S in response to the A-CNS itself failing to carry out the reconfiguration through the reconfiguration engine.

8. The A-CNS of claim 1, wherein the at least one processor is adapted to, as a third operation, instantiate the A-CNS-S together with a collection of a respective slice-based monitoring information reported by each instantiated selected probe towards a dedicated collection database of the A-CNS-S.

9. The A-CNS of claim 8, wherein the A-CNS-S is configured to report the collection of each respective slice-based monitoring information towards a slice owner.

10. A method of a slice monitor (A-CNS) for monitoring at least one network slice in a communication network, the method comprising:
storing multiple probes in at least one database;
storing a collection of probe selection profiles in the at least one database;
providing a set of network functions (NFs) or slice key performance indicators (KPIs) mapped to at least one probe among the multiple probes;
providing information about the collection of probe selection profiles;
selecting the at least one probe mapped to the set of NFs or the slice KPIs based on the information about the collection of probe selection profiles; and
instantiating the at least one probe based on information from the at least one database, wherein the communication network has a control plane (CP) and a data plane (DP), wherein the CP and DP are separated from each other, wherein each network slice is a collection of inter-connected NFs in the CP and the DP, which defines respective CP and DP slices, wherein each CP slice and each DP slice is monitored by the at least one probe, and wherein the at least one database is adapted to store multiple alarms for each NF or each slice KPI associated to a service-level agreement (SLA), each alarm corresponding to a violation of the SLA;
transmitting, over a third interface (I-AS), a slice-oriented request towards a single-slice monitoring device (A-CNS-S) adapted to monitor an individual slice among the at least one network slice; and
receiving, over the I-AS from the A-CNS-S and in response to the violation of the SLA detected by an alarm detector of the A-CNS-S, a request for a reconfiguration of the individual slice through a reconfiguration engine inside the A-CNS.

11. The method of claim 10, wherein the at least one database is adapted to store a plurality of interrupt handlers, each interrupt handler associated to at least one alarm among the multiple alarms stored in the at least one database.

12. The method of claim 10, wherein the at least one database is configurable through a configuration of content of the at least one database.

13. The method of claim 12, wherein configuring the content of the at least one database comprises at least one of modifying or deleting existing elements inside the at least one database or adding other elements inside the at least one database.

14. The method of claim 12, wherein the at least one database is configurable over a first interface (I-Cf).

15. The method of claim 10, wherein CP slice-based information and DP slice-based information is transmitted over a second interface (I-AM) along with the SLA related to a performance of the corresponding inter-connected NFs in the CP and the DP.

16. A non-transitory computer-readable medium storing program code that, when executed by a processor, cause a computer to perform a method for monitoring at least one network slice in a communication network, by performing steps of:
storing multiple probes in at least one database;
storing a collection of probe selection profiles in the at least one database;
providing a set of network functions (NFs) or slice key performance indicators (KPIs) mapped to at least one probe among the multiple probes;
providing information about the collection of probe selection profiles;
selecting the at least one probe mapped to the set of NFs or the slice KPIs based on the information about the collection of probe selection profiles; and
instantiating the at least one probe based on information from the at least one database, wherein the communication network has a control plane (CP) and a data plane (DP), wherein the CP and DP are separated from each other, wherein each network slice is a collection of inter-connected NFs in the CP and the DP, which defines respective CP and DP slices, wherein each CP slice and each DP slice is monitored by the at least one probe, and wherein the at least one database is adapted to store multiple alarms for each NF or each slice KPI associated to a service-level agreement (SLA), each alarm corresponding to a violation of the SLA;
transmitting, over a third interface (I-AS), a slice-oriented request towards a single-slice monitoring device (A-CNS-S) adapted to monitor an individual slice among the at least one network slice; and receiving, over the I-AS from the A-CNS-S and in response to the violation of the SLA detected by an alarm detector of the A-CNS-S, a request for a reconfiguration of the individual slice through a reconfiguration engine inside the A-CNS.

* * * * *